V. A. FYNN.
ALTERNATING CURRENT MOTOR AND METHOD OF CONTROL.
APPLICATION FILED JAN. 2, 1917.

1,361,245.

Patented Dec. 7, 1920.

3 SHEETS—SHEET 1.

INVENTOR
Valère A. Fynn

BY
E. E. Huffman
ATTORNEY

V. A. FYNN.
ALTERNATING CURRENT MOTOR AND METHOD OF CONTROL.
APPLICATION FILED JAN. 2, 1917.

1,361,245.

Patented Dec. 7, 1920.
3 SHEETS—SHEET 2.

INVENTOR.
Valère A. Fynn
BY
E. E. Huffman
ATTORNEY.

V. A. FYNN.
ALTERNATING CURRENT MOTOR AND METHOD OF CONTROL.
APPLICATION FILED JAN. 2, 1917.

1,361,245.

Patented Dec. 7, 1920.

3 SHEETS—SHEET 3.

INVENTOR
Valère A. Fynn
BY
S. S. Huffman
ATTORNEY

UNITED STATES PATENT OFFICE.

VALÈRE A. FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

ALTERNATING-CURRENT MOTOR AND METHOD OF CONTROL.

1,361,245.   Specification of Letters Patent.   Patented Dec. 7, 1920.

Application filed January 2, 1917. Serial No. 140,042.

*To all whom it may concern:*

Be it known that I, VALÈRE A. FYNN, a subject of the King of England, residing at the city of St. Louis, State of Missouri, United States of America, have invented a certain new and useful Alternating-Current Motor and Method of Control, of which the following is such a full, clear, and exact description, as will enable anyone skilled in the art to which it appertains to make and use the same, reference being had to the accompanying drawings, forming part of this specification.

My invention relates to alternating current commutator motors in which at least part of the energy is conveyed to the secondary, which is usually the revolving member, by static induction. It is particularly applicable to polyphase motors.

My object is to produce a machine the speed of which can be varied over a wide range independently of the load while maintaining a satisfactory power factor and preferably avoiding all switching mechanism.

In carrying out my invention I obtain a range of speeds by applying to the circuits of the induced member by means of the brushes controlling said circuits, E. M. F.'s of constant magnitude but varying phase, and I obtain other ranges of speeds by impressing on the brushes E. M. F.'s of constant phase but varying magnitude.

Figure 1:
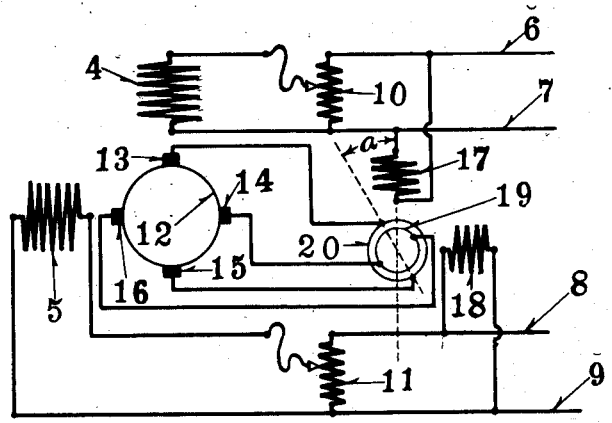
Figure 2:
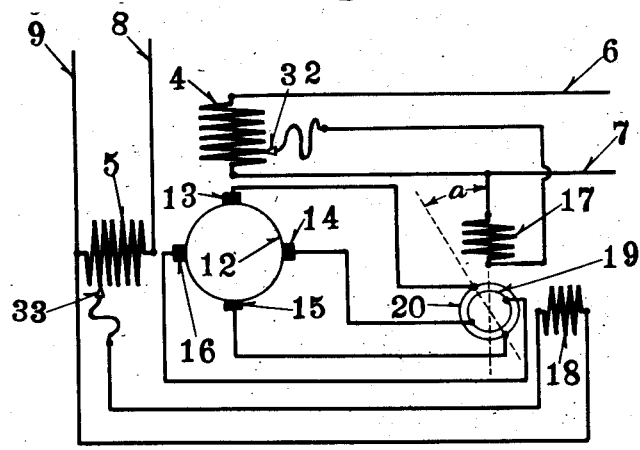
Figure 3:
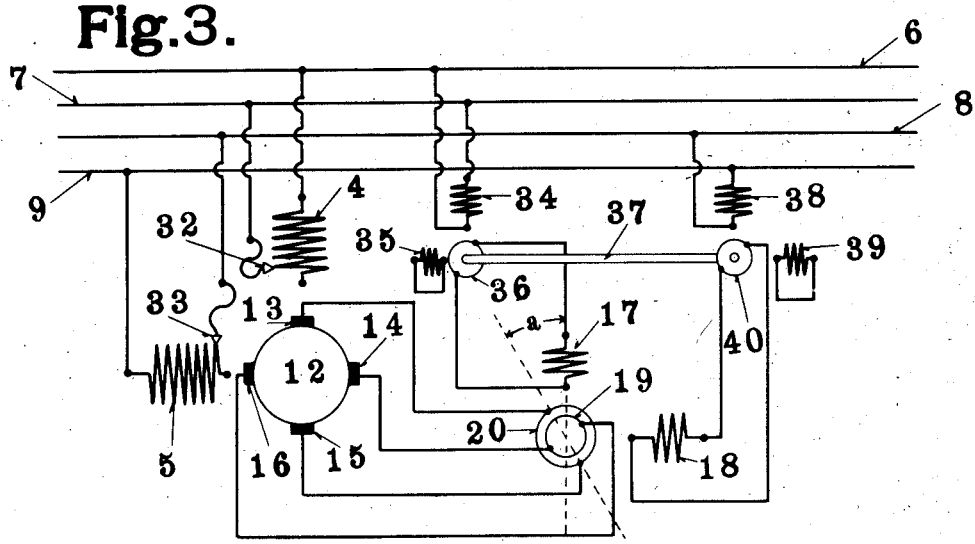

In the accompanying drawings, Figure 1 illustrates one embodiment of my invention; Figs. 2 and 3 show modifications of the motor of Fig. 1; and Figs. 4, 5, 6 and 7 are explanatory diagrams.

Referring to Fig. 1, which diagrammatically illustrates a two-pole, two-phase motor, the stator carries the inducing windings 4, 5, displaced by 90 electrical degrees and coöperating with the induced member provided with the commuted winding 12 and the stationary brushes 13, 15 and 14, 16. These brushes are preferably fixed and located in the axes of the stator inducing windings 4 and 5 respectively. The stator inducing windings are connected to the mains 6, 7, 8, 9, by means of the adjustable ratio transformers 10 and 11. The brushes coöperating with the induced member are connected to a polyphase induction regulator provided with the two movable induced windings 19, 20 and the two fixed inducing windings 17, 18. The inducing windings are connected to the mains, while the induced windings, which in the figure are shown as distributed over all the circumference of the movable member, are connected to the brushes of the motor. Thus, the induced winding 20 of the induction regulator is connected to the brushes 13, 15, located in the axis of the stator inducing winding 4, and the induced winding 19 of said regulator is connected to the brushes 14, 16 located in the axis of the stator inducing winding 5. It will be understood of course that a single winding may be employed on the rotor of the regulator.

In operating this machine for the purpose of adjusting its speed, it is only necessary to rotate the induced member of the induction regulator. No matter what position this member occupies, the E. M. F.'s at the terminals of each of its windings will always be of practically the same magnitude, but the phase of these E. M. F.'s will vary with the different positions of the rotor of the regulator; thus, when the points at which the rotor winding 20 is tapped for connection to the brushes 13, 15, are in line with the axis of the stator winding 17, then the phase of the E. M. F. conduced into the rotor 12 of the motor by way of the brushes 13, 15, will be practically of the same phase as that induced therein by the motor stator winding 4. In this position of the induced member of the regulator, the phase of the E. M. F. impressed on the brushes 14, 16, by conduction from 19, will also be the same as that induced in the rotor 12 along the axis of 5. Under these conditions the speed of the motor will either be raised or lower by the conductively supplied E. M. F., but its power factor will not be affected. If the rotor of the induction regulator is now turned through an angle $a$, then the phases of the E. M. F.'s conduced into the rotor will change, but their magnitude will remain the same, with the result that not only the speed but also the power factor of the motor will be affected.

Referring now to Fig. 2, this differs from Fig. 1 only in that it shows a means for changing the magnitude of the E. M. F.'s available at the terminals of the secondary member of the induction regulator. This change is brought about by impressing polyphase E. M. F.'s of varying magnitude on the inducing windings 17 and 18 of said induction regulator, these E. M. F.'s being derived from the inducing windings 4, 5 of the motor by means of the movable contacts 32, 33.

Another way of changing the magnitude of the E. M. F.'s impressed on the induced member of the motor, and without the use of movable contacts, is shown in Fig. 3, in which single-phase induction regulators 34, 36 and 38, 40 are introduced between mains 6, 7, 8 and 9 and the inducing windings 17, 18 of the polyphase inducting regulator, the secondary of which is connected to the brushes of the motor. The rotors of these single-phase induction regulators are mechanically interconnected by means of the shaft 37, and the stator of each is provided with a short-circuited winding displaced from the main winding, for the purpose of compensating these single-phase induction regulators. Thus, the stator of the regulator 34, 36 carries the inducing winding 34 connected to the mains 6, 7, and the short-circuited compensating winding 35 displaced by 90 electrical degrees from 34. Similarly, the stator of the other single-phase induction regulator carries a short-circuited winding 39 displaced by 90 electrical degrees from the main inducing winding 38 connected to the mains 8, 9.

Figure 7:
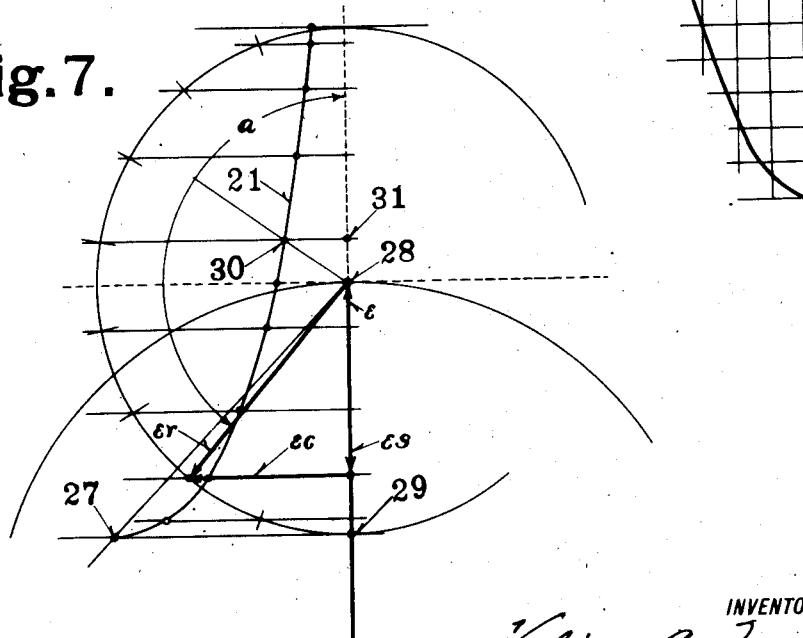

Referring to Fig. 7 and assuming that the rotor of the induction regulator has been turned through the angle $a$ there shown and which differs in magnitude from that shown in Fig. 1, and referring to the E. M. F. induced in the rotor 12 along one of its axes, as $e$, and to the E. M. F. conduced into it along that same axis, as $er$, then it will be seen that this latter can be decomposed into one component $es$, in phase with $e$, and another component $ec$ at right angles to it. The first component will affect the speed of the machine; the second will affect its power factor. As the rotor of the induction regulator is revolved about its axis, so will the end of the vector $er$ travel along the arc 3, and the value of the two components of this E. M. F. can readily be ascertained for every value of the angle $a$.

Figure 5:
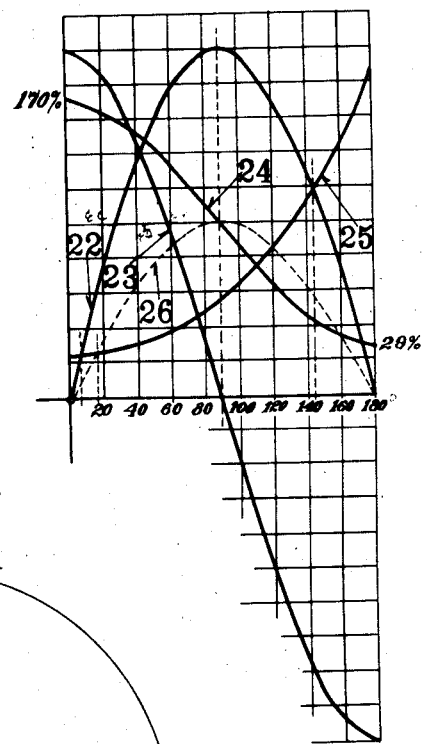

The values of the speed regulating component $es$ and the phase compensating component $ec$ have been plotted in Fig. 5, for all values of $a$ from 0 to 180 degrees, curve 22 representing the compensating, curve 23 the regulating, voltage. The actual speed of the machine will always be proportional to the vectorial sum of $e$ and $es$. Curve 24 shows the resulting motor speed as a percentage of the synchronous speed, and it is seen that when the ratio of $er$ to $e$ is as shown in the phase diagram of Fig. 7, then the maximum speed to be secured by means of the induction regulator amounts to about 170% of the synchronous, while the speed of the motor can be reduced to about 29% of the synchronous, which represents a nearly 6:1 ratio. Such a very wide range of speeds will very seldom be required in practice. The E. M. F. required for unity power factor at different speeds is indicated by the curve 25 in Fig. 5 and by the curve 21 in Fig. 7, and it is seen that for values of the angle $a$ of about 7 and about 145 degrees, the compensating voltage in this particular case has the value required for unity power factor, while for all other values of $a$ between these limits, the compensating voltage is in excess of that required for unity power factor. For values of $a$ between 0 and 7 degrees, when the machine is running above synchronism, the power factor will not be far from unity although the compensating voltage does not exactly reach the value required for unity power factor. It will also be possible to operate the machine with a sufficiently high power factor with a value of $a$ in excess of 145 degrees. Acceptable power factor values will be had up to an angle of about 160 degrees. From this it will be seen that this machine can be operated over nearly the full excessive range of speeds, referred to above, with sufficiently high power factor. The degree of compensation might, in fact, for some purposes, be found to be excessive at speeds in the immediate neighborhood of the synchronous; for at these points the available compensating voltage is considerably in excess of that required for unity power factor. In order to bring the power factor nearer to unity within that range, the terminal voltage of the motor may be increased, or the terminal voltage of the induction regulator decreased. Either can be achieved for instance by means of adjustable ratio transformers, as is shown in Fig. 1, in connection with the stator windings 4 and 5 of the motor.

If the speed range is reduced, and that can readily be achieved by reducing the value of $er$, then the average difference between the available compensating voltage and that required for unity power factor becomes very much smaller. For many practical ranges of speed variation, this difference is such as to make it, as a rule, unnecessary to resort to the use of adjustable ratio transformers, such as 10 and 11. If the value of $er$ in Fig. 7 is reduced to one-half of that shown, then the available compensating voltage in the different positions of the induction regulator will have the values shown by the dotted curve 26 of Fig. 5, and it will readily be seen that, under these conditions, the machine can be operated with satisfactory power factor values for all values of the angle $a$ between 0 and 140 degrees. For the smaller values of $er$, the available speed range will be from 73 to 127% of the synchronous, and this range will not be appreciably curtailed by limiting the displacement of the induction regulator to 140 degrees. The resulting motor speed curve is not shown in Fig. 5, but it has the same shape as the curve 24; its inclination is, however, smaller.

This method of speed regulation yields a number of speeds which is not limited to the number of switch contacts as in ordinary regulating schemes. Furthermore all speed adjustments can be made without changing any of the connections and the power factor is maintained within satisfactory limits.

I wish it to be understood that the curve 21 of Fig. 7, and the corresponding curve 25 of Fig. 5, are merely intended to indicate the manner in which the compensating voltage required in such motors to preserve unity power factor over a wide range of speeds, generally varies. The actual values of this unity power factor compensating E. M. F. will, of course, vary with the size of the machine and with the design constants, but it will always have a shape somewhat resembling that shown in Figs. 7 and 5, and the approximate curves shown in these two figures are amply sufficient for the purpose of this specification.

By referring to Fig. 7, it will be seen that the motor shown in Figs. 2 or 3 can be operated over the entire available range of speed, with unity power factor, by properly selecting the displacement of the secondary of the polyphase induction regulator and the magnitude of the E. M. F. impressed on the primary of said regulator. In order, for instance, to reduce the speed of the machine to 29% of the synchronous, it is necessary to have the vector $er$ pass through the point 27 of curve 21, and it is further necessary that the magnitude of this vector be equal (or proportional) to the distance between the points 27 and 28. Under these conditions the value of $ec$ will be equal to the distance between the points 27 and 29, and that of $es$ will be equal to the distance between the points 28 and 29. To take another example, in order to operate the machine at about 112% of the synchronous, the vector $er$ must pass through the point 30 of curve 21 and be equal in magnitude to the line 28, 30. Under these conditions, $es$ will be equal to the line 28, 31, and $ec$ to the line 30, 31.

Figure 6:
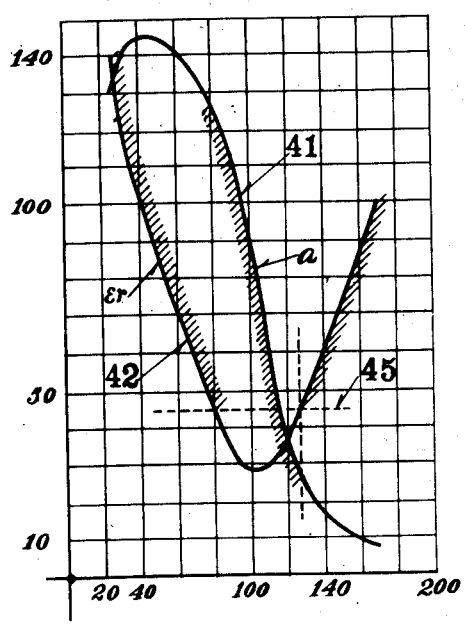

In Fig. 6 have been plotted the values of the angle $a$ and the values of the regulating voltage $er$ in per cent. of that shown in Fig. 7, for speeds of the motor varying from 29 to 170% of the synchronous, and it is seen that a very fair approximation to unity power factor can be had, over the whole range of available speeds, by dividing the total range into three periods and operating the machine within these periods, either by varying the magnitude of $er$ or by varying its phase, but not by varying both. Thus, for speeds between 29 and 80% of the synchronous, the angle $a$ can be kept constant; in other words, the secondary of the polyphase induction regulator can remain stationary while the polyphase voltages applied to its primary are varied. The same process can successfully be followed for speed ranges between 124 and 170% of the synchronous, while the intermediate range, between 80 and 124% of the synchronous, can readily be taken care of by keeping the magnitude of the polyphase E. M. F.'s impressed on the primary of the polyphase induction regulator constant and moving the secondary thereof through the angles indicated by curve 41 of Fig. 6. While keeping the angle or the magnitude of $er$ constant over a certain range of speeds, it is preferable to select that value of angle or E. M. F. which will give the best average results. Reverting more particularly to a motor operating under the conditions which are taken as a basis for the curves shown in Fig. 6, speeds below 80% of the synchronous could, for instance, be secured by keeping the angle $a$ constant, at a value of, say 130 degrees, and varying $er$ up to 80% of the synchronous along the shaded and drooping part of curve 42. For speeds from 80 to 124%, $er$ could be kept constant at a value of, say 43% of that shown in Fig. 7, and as indicated by the dotted lines 45 of Fig. 6. For all speeds above 124%, the angle $a$ could be kept constant, for instance, at a value of 23 degrees, and the value of $er$ varied along the $r$ rising and shaded part of curve 42. The available speed range can, of course, be subdivided into a greater or a smaller number of sections, regulating within one or more of these sections by changing nothing but the phase of the E. M. F.'s conduced into the rotor, while within the remaining sections, nothing but the magnitude of these E. M. F.'s is changed.

Figure 4:
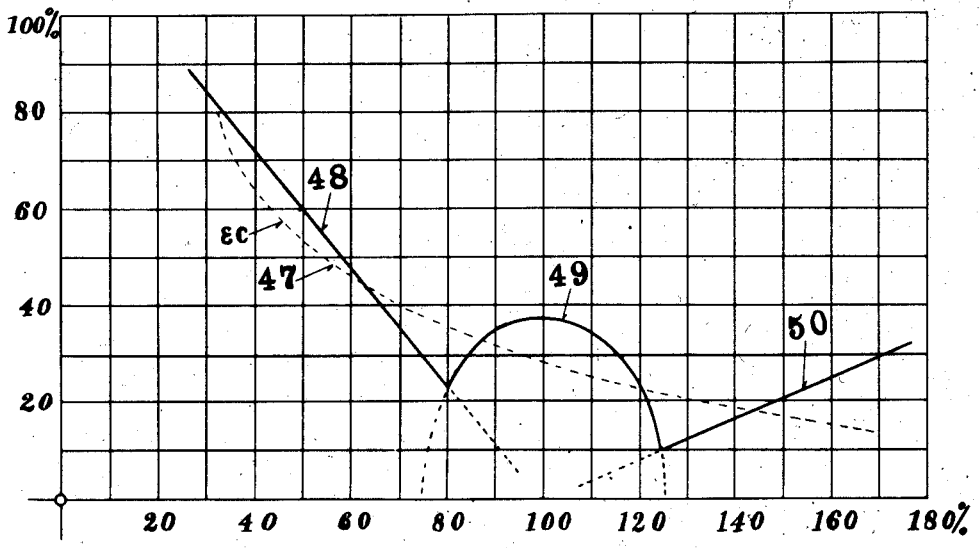

In Fig. 4 is shown the result to be obtained by regulating in the manner set forth, by way of example, in connection with Fig. 6. In Fig. 4, the dotted curve 47 shows that value of the compensating E. M. F. $ec$ which should be available at each speed within the speed range of 30 to 170% of the synchronous in order to secure unity power factor throughout the operation of the machine, while the actual available compensating E. M. F. is indicated by the straight line 48 for speeds up to 80% of the synchronous, by the curve 49 for speeds between 80 and 124% of the synchronous, and by the straight line 50 for all speeds above 124% of the synchronous. A comparison between the dotted curve 47 and the lines 48, 49, 50 shows that that value of the compensating E. M. F. which is required for unity power factor is not very greatly departed from at any of the available speeds, and that the actual available compensating E. M. F. for the greater portion of the entire speed range is in excess of that required for unity power factor.

This method of speed regulation is preferably practised in connection with the arrangement shown in Fig. 3, in which case any speed between the limits chosen can be obtained without changing any connections.

Having fully described my invention, what I claim as new and desire to secure by Letters Patent of the United States is:

1. In a polyphase motor, the combination of an inducing member, an induced member, means for conductively supplying E. M. F.'s to said induced member, means for varying the phases of said E. M. F.'s without varying their magnitude, and means for varying the magnitude of the E. M. F.'s inductively impressed on the induced member.

2. In a polyphase motor, the combination of an inducing member, an induced member, a polyphase induction regulator for supplying to the induced member along stationary axes polyphase E. M. F.'s of variable phase, and means for varying the magnitude of the E. M. F.'s inductively impressed on the induced member.

3. In a polyphase motor, the combination of an inducing member, an induced member, a polyphase induction regulator having its secondary connected to the induced member, and single-phase induction regulators, one in circuit with each phase of the primary of the polyphase regulator.

4. In a polyphase motor, the combination of an inducing member, an induced member, a polyphase induction regulator having its secondary connected to the induced member, single-phase induction regulators, each connected between a primary winding of the polyphase induction regulator and a phase of the supply, and means for mechanically interconnecting all the secondaries of the single-phase induction regulators.

5. In a polyphase motor, the combination of an inducing member, an induced member provided with a commuted winding, brushes for conductively supplying E. M. F.'s to said winding along axes stationary with respect to the inducing member, a polyphase induction regulator having its induced member connected to said brushes, single-phase induction regulators, each phase of the polyphase regulator being in circuit with a secondary of a single-phase regulator, the primaries of said regulators being connected to different phases of the supply and their secondaries being mechanically interconnected, and means for varying the magnitude of the E. M. F.'s impressed on the inducing member of the induction regulator.

6. The method of controlling a polyphase motor, which comprises conductively supplying alternating current voltages to both members thereof, and varying the magnitude of the voltages inductively impressed on one member and the phase of the voltages conductively supplied to said member to obtain a certain range of speeds.

7. The method of controlling a polyphase motor, which consists in conductively supplying polyphase voltages to both members of the motor, varying the magnitude only of the voltages supplied to the secondary member for obtaining one range of speeds, and varying the phase only of the voltages supplied to said member for obtaining another range of speeds.

8. The method of controlling a polyphase motor, which consists in conductively supplying polyphase voltages to both members of the motor, varying the magnitude only of the voltages supplied to the secondary member for obtaining one range of speeds, varying the magnitude of the voltages inductively impressed on the secondary member, and varying the phase only of the voltages supplied to the secondary member for obtaining another range of speeds.

9. The method of controlling a polyphase motor, which consists in supplying alternating current voltages to both members of the motor, varying the magnitude only of the voltages supplied to the secondary member to obtain the lower speeds, varying the phase only of said voltages to obtain intermediate speeds including the synchronous, and varying the magnitude only of said voltages to obtain the higher speeds.

In testimony whereof, I have hereunto set my hand and affixed my seal.

VALÈRE A. FYNN. [L. S.]